United States Patent
Kromer et al.

(10) Patent No.: US 6,957,595 B2
(45) Date of Patent: Oct. 25, 2005

(54) TILT STEERING WHEEL MECHANISM

(75) Inventors: Mark Joseph Kromer, Martinez, GA (US); Paul Michael Elhardt, Turtle Lake, ND (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 09/905,530

(22) Filed: Jul. 13, 2001

(65) Prior Publication Data

US 2003/0015056 A1 Jan. 23, 2003

(51) Int. Cl.$^7$ ................................................ B62D 1/18
(52) U.S. Cl. ........................................ 74/493; 280/775
(58) Field of Search ......................... 74/493, 492, 495, 74/496, 498, 491, 527, 530; 280/775

(56) References Cited

U.S. PATENT DOCUMENTS

| | | | | |
|---|---|---|---|---|
| 4,152,951 A | * | 5/1979 | Korczykowski | 74/473.12 |
| RE31,646 E | * | 8/1984 | Beals et al. | 180/78 |
| 4,495,833 A | * | 1/1985 | Fourrey et al. | 74/493 |
| 4,509,386 A | * | 4/1985 | Kimberlin | 74/492 |
| 4,541,298 A | * | 9/1985 | Strutt | 74/493 |
| 4,656,887 A | * | 4/1987 | Yoshida | 74/493 |
| 4,774,851 A | * | 10/1988 | Iwanami et al. | 74/493 |
| 4,972,732 A | * | 11/1990 | Venable et al. | 74/493 |
| 5,199,319 A | * | 4/1993 | Fujiu | 74/493 |
| 5,230,533 A | * | 7/1993 | Yamaguchi | 280/775 |
| 5,363,716 A | * | 11/1994 | Budzik et al. | 74/493 |
| 5,423,572 A | * | 6/1995 | Stuedemann et al. | 280/775 |
| 5,481,938 A | * | 1/1996 | Stuedemann et al. | 74/493 |
| 5,613,404 A | * | 3/1997 | Lykken et al. | 74/493 |
| 5,678,454 A | * | 10/1997 | Cartwright et al. | 74/493 |
| 5,737,971 A | * | 4/1998 | Riefe et al. | 74/493 |
| 5,813,289 A | * | 9/1998 | Renick et al. | 74/493 |
| 5,820,163 A | * | 10/1998 | Thacker et al. | 280/775 |
| 5,836,211 A | * | 11/1998 | Ross et al. | 74/493 |
| 5,941,129 A | * | 8/1999 | Anspaugh et al. | 74/493 |
| 6,019,391 A | * | 2/2000 | Stuedemann et al. | 280/779 |
| 6,134,983 A | * | 10/2000 | Armstrong et al. | 74/493 |
| 6,223,620 B1 | * | 5/2001 | Jolley | 74/493 |
| 6,345,842 B1 | * | 2/2002 | Igarashi et al. | 280/775 |
| 6,357,318 B1 | * | 3/2002 | Koellisch et al. | 74/493 |
| 6,357,794 B1 | * | 3/2002 | DuRocher | 280/777 |

FOREIGN PATENT DOCUMENTS

GB    2 281 375    *    3/1995

* cited by examiner

Primary Examiner—William C. Joyce
(74) Attorney, Agent, or Firm—The Law Office of Randall T. Erickson, P.C.

(57) ABSTRACT

A tilt steering wheel mechanism for an agricultural tractor or like implement includes a steering shaft support and a tilt coupling mounted on the shaft support for relative pivotal movement. A rotatable steering shaft, and associated steering wheel, are joined to the tilt coupling for pivotal movement therewith, with a collar-like tilt latch fitted to the tilt coupling for maintaining the steering wheel in any of a plurality of selected angular dispositions. Convenient and efficient operation of the tilt mechanism is facilitated by the provision of a generally U-shaped latch release which is positioned in close proximity to the steering wheel so as to facilitate single-handed grasping of the steering wheel and operation of the latch release. The latch release includes a pair of cam surfaces which cooperate with a pair of cam followers provided on the tilt latch for selectively latching and unlatching the tilt mechanism.

18 Claims, 3 Drawing Sheets

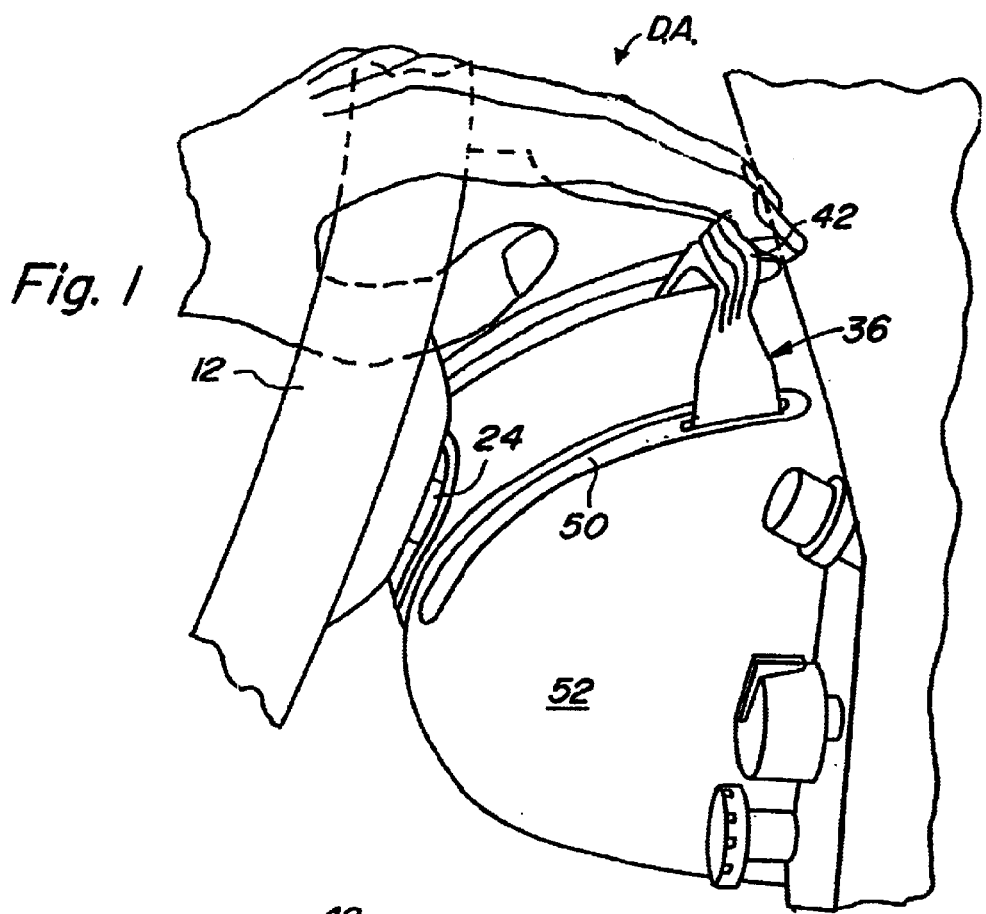
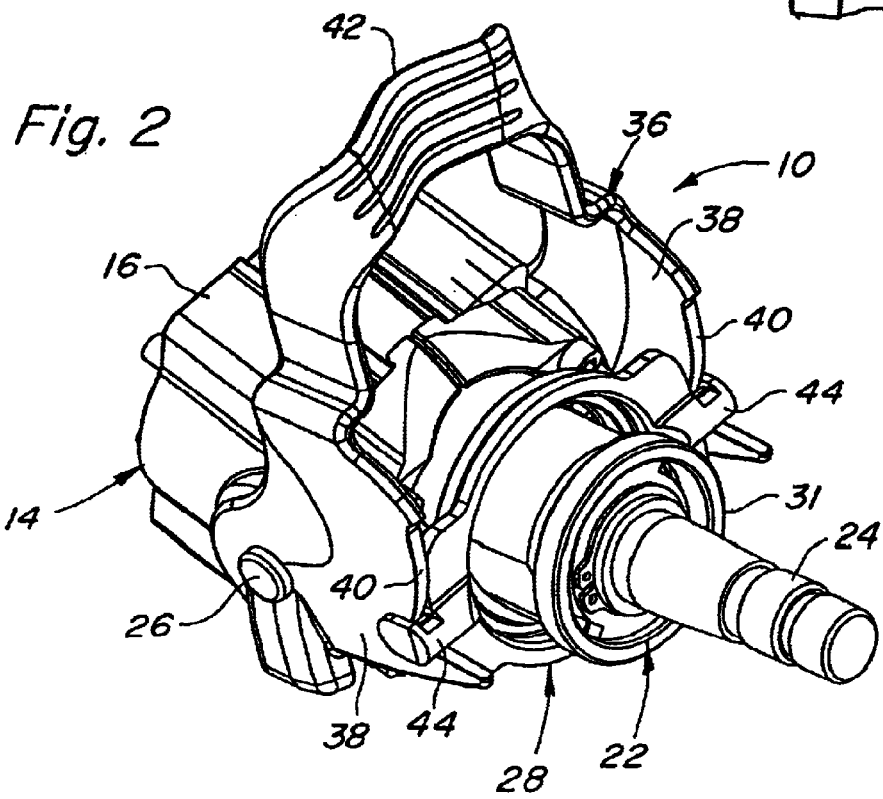

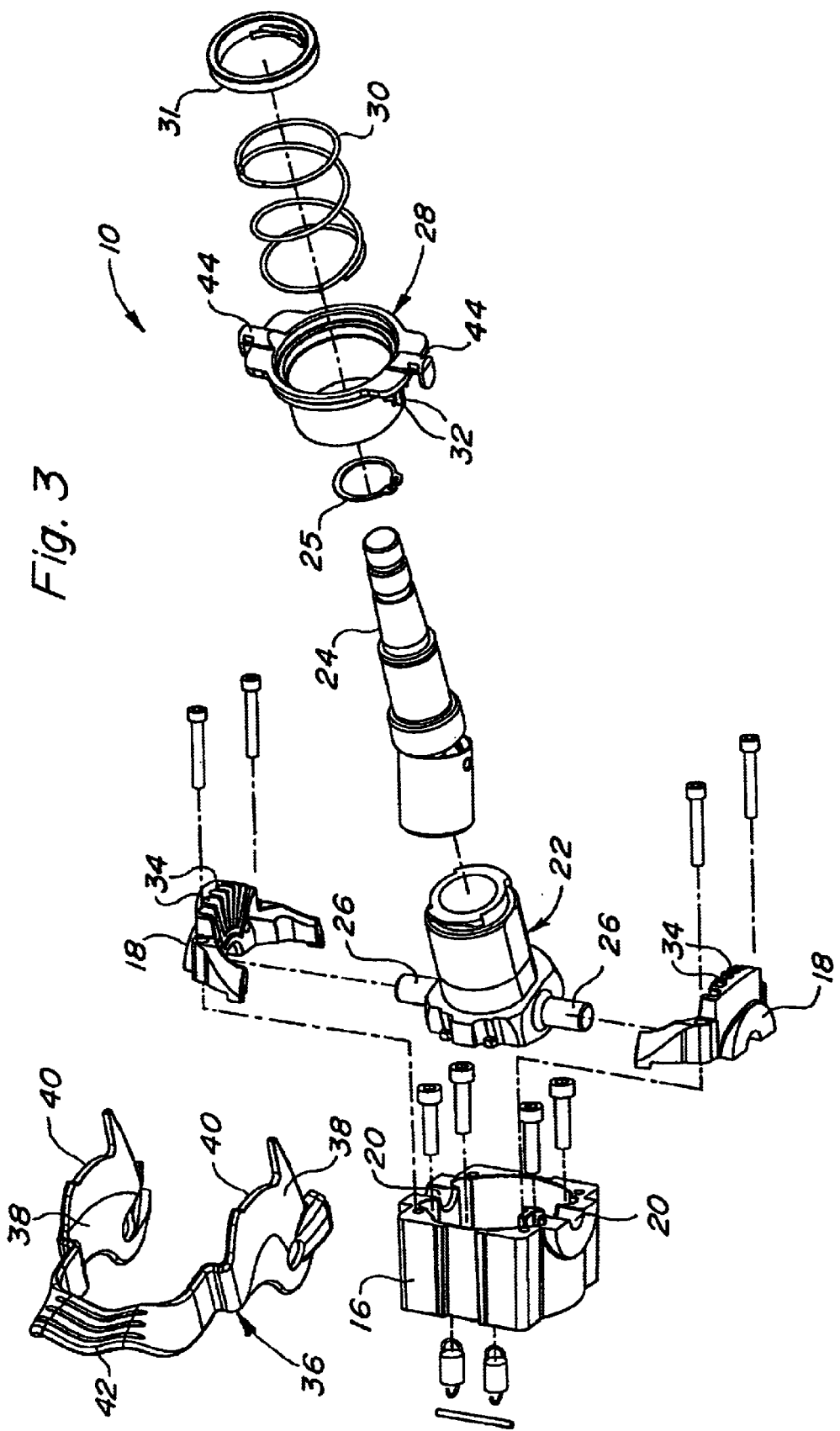

TILT STEERING WHEEL MECHANISM

TECHNICAL FIELD

The present invention relates generally to a tilt steering wheel mechanism such as for use for adjustably positioning the steering wheel of an agricultural tractor or like implement, and more particularly to a tilt steering wheel mechanism positioned in operative association with an associated steering wheel, so that single-handed operation of the mechanism is permitted while simultaneously gripping the steering wheel.

BACKGROUND OF THE INVENTION

The provision of a tilt steering wheel mechanism for an agricultural tractor or like implement facilitates convenient and efficient operation of the implement. This type of mechanism ordinarily permits the operator to adjustably tilt or pivot the steering wheel and its associated shaft, so that the axis about which the steering wheel rotates during operation is positioned comfortably for the arms of the operator. Together with adjustable positioning of the associated seat, a tilt steering wheel mechanism facilitates comfortable and efficient operation of the implement by different operators who vary in size and stature.

U.S. Pat. No. 5,836,211, hereby incorporated by reference, illustrates a tilt steering mechanism of the general type which can be used in association with an agricultural implement or the like. This type of mechanism is typically operated by movement of a lever by the operator, which movement releases locking components of the mechanism to permit the steering wheel to be selectively positioned upwardly and downwardly. However, heretofore, typical steering wheel mechanisms have required the use of two hands to adjust the steering wheel angle. In some instances, two hands are required because of the distance between locking/unlocking lever or actuator of the mechanism, and the associated steering wheel. In such arrangements, one hand is used to release the tilt mechanism, while the other stabilizes and positions the steering wheel. In the mechanism disclosed in the above-referenced U.S. patent, two hands are required to simultaneously release the locking device (to prevent binding of the sliding collar disclosed therein) and to locate and position the steering wheel.

As will be appreciated, convenient and efficient adjustment of a steering wheel's angle facilitates efficient operation of the associated implement. The present invention is directed to a tilt steering wheel mechanism which is particularly configured to facilitate convenient operation, including single-handed release of the mechanism, and selected positioning of the associated steering wheel.

SUMMARY OF THE INVENTION

In accordance with the present invention, a tilt steering wheel mechanism is disclosed which is particularly configured to facilitate single-handed operation of the mechanism, while an operator simultaneously grips the associated steering wheel for selective adjustment of its angular disposition. In the preferred form, the present tilt wheel steering mechanism includes a generally U-shaped latch release positioned in close association with the associated steering wheel, whereby the steering wheel can be conveniently gripped while the latch release is operated with the same hand for releasing and unlocking the tilting mechanism. Single-handed operation and adjustment of the mechanism is thus permitted, facilitating convenient and efficient use of the associated implement.

In accordance with the illustrated embodiment, the present tilt steering wheel mechanism includes a steering shaft support which is mounted on the associated implement for support of an associated steering shaft and steering wheel. A tilt coupling is mounted on the steering shaft support for relative pivotal movement about a tilt axis, with the shaft support preferably defining a pair of pivot journals in which are respectively mounted a pair of tilt pivot pins of the tilt coupling.

A rotatable steering shaft is joined to the tilt coupling for pivotal movement therewith about the tilt axis. A steering wheel is mounted on the steering shaft, and permits rotational steering inputs in a conventional manner.

The present mechanism further includes a tilt latch which is operatively engageable with the steering shaft support, and which cooperates therewith to maintain the steering shaft, and steering wheel, in any of a plurality of selected angular dispositions with respect to the steering shaft support. In accordance with the illustrated embodiment, the tilt latch is configured as a collar fitted generally about the tilt coupling, with the tilt latch being movable generally axially of the steering shaft (i.e., perpendicular to the tilt axis), in opposition to an associated biasing spring. The tilt latch is movable between an unlatched or unlocked position, wherein the steering shaft and steering wheel can be pivoted about the tilt axis, and a latched or locked position in engagement with the steering shaft support to prevent pivotal movement of the steering wheel and steering shaft. In accordance with the preferred form, the steering shaft support and tilt latch each include one or more interengageable teeth, with the teeth being engageable to define a plurality of angular dispositions of the steering shaft relative to the steering shaft support. Movement of the tilt latch between the latched and unlatched positions moves the teeth out of engagement with each other, with the associated steering wheel and steering shaft thus being adjustably angularly positionable relative to the shaft support.

In accordance with the present invention, operation of the present mechanism is effected by the provision of a latch release operatively connected to the tilt latch of the mechanism. Notably, the latch release has a gripping portion positioned in sufficiently close proximity to the steering wheel so as to permit single-handed movement of the latch release while grasping the steering wheel. The latch release is movable to move the tilt latch to the unlatched position, to thereby permit single-handed unlatching of the tilt latch and pivotal movement of the steering wheel and steering shaft.

In the preferred form, the latch release is pivotally movable about the tilt axis, thus further facilitating convenient manipulation of the latch release, and adjustable positioning of the steering wheel. The latch release is operatively connected with the tilt latch by a cam arrangement, with the latch release including one of a cam surface and a cam follower, and the tilt latch including the other of a cam surface and a cam follower. By this arrangement, movement of the latch release acts through the cam surface and follower to move the tilt latch.

In the illustrated embodiment, the latch release is generally U-shaped, and includes a pair of cam surfaces positioned generally on respective opposite sides of the tilt coupling of the mechanism. The tilt latch includes a pair of cam followers respectively engageable with the cam surfaces so that movement of the latch release moves the tilt mechanism between the latched and unlatched positions. A gripping portion extends between side plates of the latch release which define the cam surfaces, thus desirably facilitating convenient single-handed operation of the tilt mechanism, while assuring that the unlatching forces of the mechanism are evenly distributed on the collar-like tilt latch for smooth operation without binding.

Other features and advantages of the present invention will become readily apparent from the following detailed description, the accompanying drawings, and the appended claims.

BRIEF DESCRIPTION OF THE DRAWINGS

FIG. 1 is a fragmentary, perspective view of the dash area of an agricultural tractor or like implement;

FIG. 2 is a perspective view of a tilt wheel steering mechanism embodying the principles of the present invention;

FIG. 3 is an exploded, perspective view of the tilt wheel steering mechanism shown in FIG. 2.

DETAILED DESCRIPTION

Figure 4:
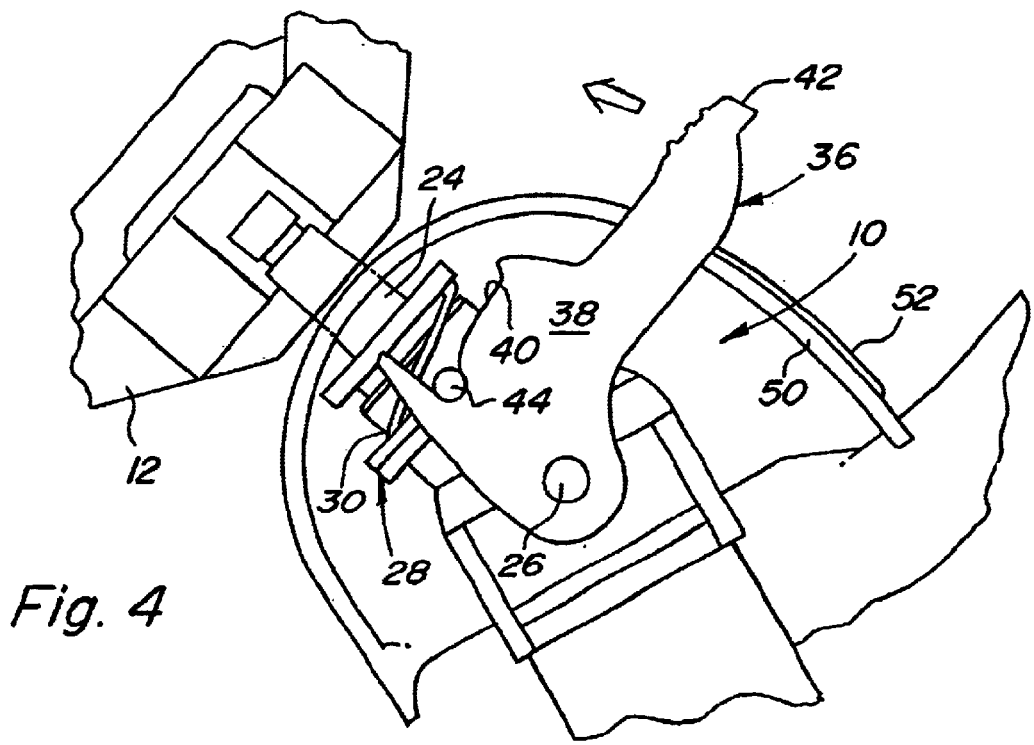
FIGS. 4 and 5 are diagrammatic views illustrating operation of the present tilt steering wheel mechanism, including operation between a latched (FIG. 4) condition and an unlatched (FIG. 5) condition.

While the present invention is susceptible of embodiment in various forms, there is shown in the drawings, and will hereinafter be described, a presently preferred embodiment, with the understanding that the present disclosure is to be considered as an exemplification of the invention, and is not intended to limit the invention to the specific embodiment illustrated.

With reference now to FIG. 1, therein is illustrated the dash area DA of an agricultural tractor or like implement for which the tilt steering wheel mechanism embodying the principles of the present invention is suited for use. The tilt steering wheel mechanism, generally designated 10, is illustrated in FIGS. 2 and 3, and is provided for permitting selective adjustable angular positioning of the steering wheel 12 of the implement. As will be further described, the present steering wheel adjustment mechanism has been particularly configured for single-handed operation, that is, is configured to permit an operator to simultaneously release or unlock the mechanism while grasping the steering wheel 12 to adjust its angular disposition, and thereafter re-latch the mechanism, all by manipulation with a single hand.

With particular reference to FIGS. 2 and 3, the present tilt steering wheel mechanism 10 includes a multi-piece steering shaft support 14 which is fixedly mounted on the associated implement, and with respect to which the steering wheel 12 is adjustably angularly positionable. As illustrated in FIG. 3, the steering shaft support 14 includes a base 16, and a pair of caps 18 fixedly secured to the base with suitable mechanical fasteners. The base 16 and caps 18 together define a pair of pivot journals 20 which define a tilt axis about which the steering wheel 12 is adjustably positioned.

The present tilt mechanism 10 further includes a tilt coupling 22 pivotally mounted on the steering shaft support 14. The tilt coupling is mounted on the steering shaft support for relative pivotal movement about the tilt axis, and to this end, includes a pair of tilt pivot pins 26 which are respectively mounted in the pivot journals 20 of the shaft support.

A rotatable steering shaft 24 is joined to the tilt coupling 22 for pivotal movement therewith, with the steering wheel 12 mounted on the steering shaft for effecting rotational steering input to the shaft. A suitable locking clip 25 joins the components.

A spring-biased tilt latch 28, configured as a locking collar, cooperates with the shaft support 14 to releaseably maintain the tilt coupling 22 and steering shaft 24 (and steering wheel 12) in any of a plurality of selected angular dispositions with respect to the shaft support. The collar-like tilt latch is fitted generally about the tilt coupling 22, with the tilt latch 28 being movable generally axially of the steering shaft 24, perpendicular to the tilt axis, between unlatched and latched positions. The tilt latch 28 is urged and biased into operative engagement with the shaft support by a compression coil spring 30 mounted on steering shaft 24, which is held captive by an associated spring collar 31.

Locking cooperation between the tilt latch 28 and the caps 18 of the steering shaft support 14 is provided by one or more locking teeth provided on each of the shaft support and tilt latch. Specifically, the tilt latch 28 includes, at diametrically opposite sides thereof, one or more locking teeth 32, while each of caps 18 of steering shaft support 14 include one or more interengageable locking teeth 34. Movement of the tilt latch 28 away from the tilt coupling 22 acts to disengage the locking teeth 32, 34, thus permitting pivotal movement of the steering shaft 24 and tilt coupling 22 as they rotate together about the tilt axis.

In accordance with the present invention, a generally U-shaped latch release 36 is provided for effecting movement of the tilt latch 28 along the steering shaft 24. In the preferred form, the latch release 36 includes a pair of side plates 38, each of which defines a cam surface or profile 40, and a gripping portion 42 extending between the side plates 38. The cam surfaces 40 respectively engage and cooperate with a pair of cam followers 44 provided on the collar-like tilt latch 28, generally on respective opposite sides of the tilt latch. Provision of a pair of identical cam surfaces 40 and cam followers 44 desirably acts to distribute the force required for axially moving and releasing the tilt latch, while avoiding binding, in opposition to the biasing spring 30.

In the preferred embodiment, the latch release 36 is pivotal about an axis which is coincident with the tilt axis defined by pivot pins 36 of tilt coupling 22. In a particularly preferred form, the tilt latch is mounted on the pivot pins 26 of the tilt coupling to provide a compact and desirably straightforward configuration for the mechanism.

In the preferred form of the present tilt mechanism, a slidable protective cover 50 is provided which is slidably positioned beneath an outer housing 52 for the mechanism. By virtue of the slidable configuration of the protective cover 50, the cover is movable together with the latch release 36 as it is operated to move the tilt latch 28 between its latched and unlatched positions. The tilt mechanism is thus desirably protected against dirt and debris, while presenting the dash area DA of the implement with a desirably uncluttered appearance. The requirement for a protective rubber boot or the like, which can be subject to deterioration in the elements, is thus desirably avoided.

Figure 5:
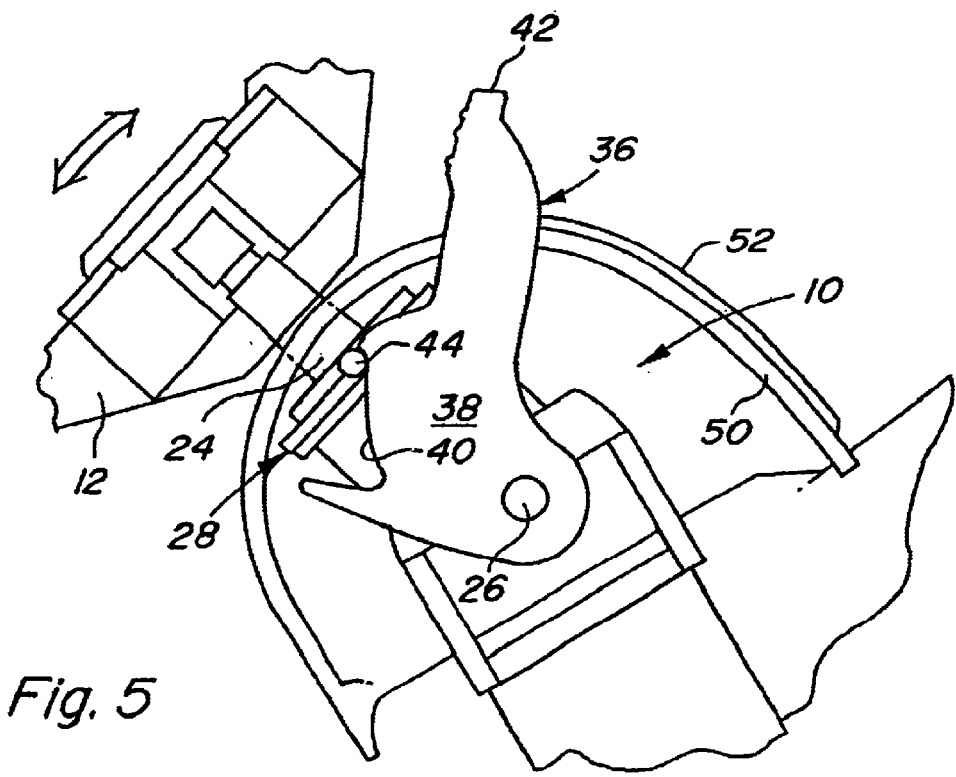

As will be evident from FIG. 1, as well as diagrammatic FIGS. 4 and 5, the gripping portion 42 of the latch release 36 is positioned sufficiently close to the steering wheel 12 as to permit single-handed gripping of the wheel and operation of the latch release. For operation, the steering wheel 12 and gripping portion 42 of the latch release, are simultaneously grasped with a single hand, and the latch release pivotally moved generally toward the steering wheel (see FIG. 4). As the latch release 36 is pivoted in this fashion, the cam surfaces 40 are moved so as to urge cam followers 44 of tilt latch 28 generally axially outwardly of steering shaft 24, in opposition to biasing spring 30. Attendant to this movement, locking teeth 32, 34 are disengaged, thus permitting the tilt coupling 22, steering shaft 24, and steering wheel 12 to be selectively tilted and angularly positioned with respect to the associated shaft support. During such adjustable positioning, the operator maintains the single-handed grasp of the steering wheel and latch release 36, as the steering wheel is moved to its selected position.

When the steering wheel 12 has been positioned as desired, the latch release 36 is released. Biasing spring 30 acts through tilt latch 28 to generally urge the gripping portion 42 of the latch release 36 away from steering wheel 12 with the cam followers 44 again resuming the position illustrated in FIG. 4 with respect to cam surfaces 40. During this releasing action, the interengageable locking teeth 32, 34 of the tilt latch 28 and the caps 18 of steering shaft support 14 move back into interengagement, thus firmly locking the steering wheel and steering shaft against any further angular movement, while permitting normal steering input to the steering wheel.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A tilt steering wheel mechanism, comprising:
a steering shaft support;
a tilt coupling mounted on said steering shaft support for relative pivotal movement about a tilt axis;
a rotatable steering shaft joined to said tilt coupling for pivotal movement therewith, and a steering wheel mounted on said steering shaft;
a tilt latch operatively engageable with said steering shaft support, and movable between an unlatched position wherein said steering shaft and steering wheel can be pivoted relative to said steering shaft support, and a latched position in engagement with said steering shaft support to prevent pivotal movement of said steering shaft and said steering wheel; and
a latch release operatively connected to said tilt latch having a gripping portion movable between an at rest position corresponding to said tilt latch being in said latched position, and a shifted position corresponding to said tilt latch being in said unlatched position, said gripping portion positioned in sufficiently close proximity to said steering wheel so that a normal sized hand can reach said latch release in said at rest position while at the same time said normal sized hand grasps said steering wheel, said latch release being movable to said shifted position to move said tilt latch to said unlatched position, to thereby permit single-handed unlatching of said tilt latch and pivotal movement of said steering wheel and steering shaft, while said normal sized hand remains grasping said steering wheel;
wherein said gripping portion is centered at about a 12 o'clock position on said steering wheel.

2. A tilt steering wheel mechanism in accordance with claim 1, wherein:
said latch release is pivotally movable about said tilt axis.

3. A tilt steering wheel mechanism in accordance with claim 1, wherein:
said latch release includes one of a cam surface and a cam follower, and said tilt latch includes the other of a cam surface and cam follower, so that movement of said latch release moves said tilt latch by said cam surface moving on said cam follower.

4. A tilt steering wheel mechanism in accordance with claim 3, wherein:
said steering shaft support and said tilt latch each include one or more interengageable teeth, said teeth being engageable to define a plurality of angular dispositions of said steering shaft relative to said steering shaft support, wherein movement of said tilt latch between said latched and unlatched positions moves said teeth out of engagement with each other.

5. A tilt steering wheel mechanism in accordance with claim 1, wherein:
said latch release includes a pair of cam surfaces positioned generally on respective opposite sides of said tilt coupling, said tilt latch including a pair of cam followers respectively engageable with said cam surfaces so that movement of said latch release moves said tilt latch between said latched and unlatched positions by said cam surfaces moving on said cam followers.

6. A tilt steering wheel mechanism in accordance with claim 5, wherein:
said latch release is pivotally moveable about said tilt axis.

7. A tilt steering wheel mechanism in accordance with claim 5, wherein:
said latch release includes a gripping portion extending between side plates which respectively define said cam surfaces, said gripping portion being positioned sufficiently close to said steering wheel as to permit single-handed gripping of said wheel and operation of said latch release.

8. A tilt steering wheel mechanism in accordance with claim 7, wherein said gripping portion is centered on a 12 o'clock position on said steering wheel.

9. A tilt steering wheel mechanism, comprising:
a steering shaft support;
a tilt coupling mounted on said steering shaft support for relative pivotal movement about a tilt axis;
a rotatable steering shaft joined to said tilt coupling for pivotal movement therewith, and a steering wheel mounted on said steering shaft;
a tilt latch operatively engageable with said steering shaft support, and movable between an unlatched position wherein said steering shaft and steering wheel can be pivoted relative to said steering shaft support, and a latched position in engagement with said steering shaft support to prevent pivotal movement of said steering shaft and steering wheel; and
a latch release operatively connected to said tilt latch having a gripping portion positioned in sufficiently close proximity to said steering wheel as to permit single-handed movement of said latch release while grasping said steering wheel, said latch release being movable to move said tilt latch to said unlatched position, to thereby permit single-handed unlatching of said tilt latch and pivotal movement of said steering wheel and steering shaft;
wherein said latch release includes a pair of cam surfaces positioned generally on respective opposite sides of said tilt coupling, said tilt latch including a pair of cam followers respectively engageable with said cam surfaces so that movement of said latch release moves said tilt latch between said latched and unlatched positions; and
wherein said tilt latch is configured as a collar substantially surrounding said tilt coupling, said mechanism including a biasing spring biasing said tilt latch toward said latched position.

10. A tilt steering wheel mechanism in accordance with claim 9,
wherein said gripping portion is centered on a 12 o'clock position on said steering wheel.

11. A tilt steering wheel mechanism, comprising:
a steering shaft support having a pair of pivot journals;
a tilt coupling mounted on said steering shaft support, and having a pair of tilt pivot pins respectively mounted in said pivot journals for pivotal movement of said tilt coupling relative to said shaft support about a tilt axis;
a rotatable steering shaft joined to said tilt coupling for pivotal movement therewith, and a steering wheel mounted on said steering shaft;

a tilt latch operatively engageable with said steering shaft support, said tilt latch being configured as a collar substantially surrounding said tilt coupling, said tilt latch being moveable generally axially of said steering shaft between an unlatched position wherein said steering shaft and said steering wheel can be pivoted about said tilt axis, and a latched position in engagement with said steering shaft support to prevent pivotal movement of said steering shaft and said steering wheel; and the a latch release connected to said tilt latch, said latch having a pair of cam surfaces positioned generally on respective opposite sides of said tilt latch, said tilt latch including a pair of cam followers in respective engagement with said cam surfaces so that movement of said latch release moves said tilt latch between said latched and unlatched positions by said cam surfaces moving on said cam followers.

12. A steering wheel tilt mechanism in accordance with claim 11, wherein:

said latch release is mounted on said pivot pins of said tilt coupling.

13. A tilt steering wheel mechanism in accordance with claim 11, including:

a biasing spring biasing said tilt latch toward said latched position.

14. A tilt steering wheel mechanism in accordance with claim 13, wherein:

said steering shaft support and said tilt latch each include one or more interengageable teeth, said teeth being engageable to define a plurality of angular dispositions of said steering shaft relative to said steering shaft support, wherein movement of said tilt latch between said latched and unlatched positions moves said teeth out of engagement with each other.

15. A tilt steering wheel mechanism in accordance with claim 14, wherein:

said steering shaft support comprises a base, and a pair of caps fitted to said base which, together with said base, define said pair of pivot journals;

each of said caps including one or more of said teeth interengageable with the teeth of said tilt latch.

16. A tilt steering wheel mechanism in accordance with claim 11, wherein:

said latch release includes a gripping portion extending between side plates which respectively define said cam surfaces, said gripping portion being positioned sufficiently close to said steering wheel as to permit single-handed gripping of said wheel and operation of said latch release.

17. A tilt steering wheel mechanism in accordance with claim 16, wherein said gripping portion is centered on a 12 o'clock position on said steering wheel.

18. A tilt steering wheel mechanism in accordance with claim 11, including:

a slidable protective cover through which said latch release extends for covering said mechanism, said protective cover being movable together with said latch release as it is operated to move said tilt latch between said latched and unlatched positions.

\* \* \* \* \*